United States Patent
Woodiwiss

(10) Patent No.: US 10,882,209 B2
(45) Date of Patent: Jan. 5, 2021

(54) NON-FLAMMABLE COMPOSITIONS

(71) Applicant: AML Technologies LLC, Barberton, OH (US)

(72) Inventor: Andy Woodiwiss, Waterford, MI (US)

(73) Assignee: AML Technologies LLC, Eubank, KY (US)

( * ) Notice: Subject to any disclaimer, the term of this patent is extended or adjusted under 35 U.S.C. 154(b) by 0 days.

(21) Appl. No.: 16/284,706

(22) Filed: Feb. 25, 2019

(65) Prior Publication Data

US 2019/0184596 A1 Jun. 20, 2019

Related U.S. Application Data

(63) Continuation-in-part of application No. PCT/GR2016/000071, filed on Dec. 30, 2016.

(30) Foreign Application Priority Data

Oct. 21, 2016 (GR) ............................. 20160100545

(51) Int. Cl.
| | |
|---|---|
| *B27K 3/32* | (2006.01) |
| *B27K 3/00* | (2006.01) |
| *C09K 21/02* | (2006.01) |
| *C09K 21/14* | (2006.01) |
| *B27K 3/52* | (2006.01) |
| *C09D 5/18* | (2006.01) |

(52) U.S. Cl.
CPC ................ *B27K 3/32* (2013.01); *B27K 3/007* (2013.01); *B27K 3/52* (2013.01); *C09K 21/02* (2013.01); *C09K 21/14* (2013.01); *B27K 2240/30* (2013.01)

(58) Field of Classification Search
CPC . B27K 3/32; B27K 3/007; B27K 3/52; B27K 2240/30; C09K 21/02; C09K 21/14; C09D 5/18
See application file for complete search history.

(56) References Cited

U.S. PATENT DOCUMENTS 8,729,155 B2 * 5/2014 Wierzbicki ............ C09K 21/02
523/179
2018/0002606 A1 1/2018 Kamimoto et al.

FOREIGN PATENT DOCUMENTS

| CN | 105 295 664 A | 2/2016 |
|---|---|---|
| WO | 2016/125612 A1 | 8/2016 |

OTHER PUBLICATIONS

WIPO, International Search Report, Patent Appln. No. PCT/GR2016/000071 for "Fire-Resistant Material having Flame-Retarding Properties", dated May 31, 2017 (Subject US patent application is a CIP of this PCT application).

* cited by examiner

Primary Examiner — Andrew J. Oyer
(74) Attorney, Agent, or Firm — Buckingham Doolittle & Burroug; Timothy A. Hodgkiss

(57) ABSTRACT

A non-flammable composition is formulated to include ceramic powder, graphite, mica and $ZrO_2$. The non-flammable composition is capable of being applied to an external surface of an item, or may be incorporated into the substrate material used to form an item prior to the item's manufacture. The non-flammable composition provides both fire-resistance and fire-retardant properties to the items that are treated thereby.

13 Claims, No Drawings

NON-FLAMMABLE COMPOSITIONS

CROSS-REFERENCE TO RELATED APPLICATION

This application is a continuation-in-part of International Application No. PCT/GR2016/000071 filed Dec. 30, 2016 entitled "Fire-Resistant Material Having Flame-Retarding Properties", which claims the benefit of Greek Application No. 20160100545 filed Oct. 21, 2016, the contents of which are incorporated herein by reference.

TECHNICAL FIELD

Generally, the embodiments disclosed herein relate to non-flammable compositions of matter that possess fire-resistant and/or fire-retardant properties. Particularly, the embodiments disclosed herein relate to inorganic non-flammable compositions. More particularly, the embodiments disclosed herein relate to inorganic non-flammable compositions of matter that are capable of being incorporated into other compositions, or that are otherwise utilized to treat an item, to impart fire-resistant and/or fire-retarding properties thereto.

BACKGROUND

From the enormous cost in human life to catastrophic structural damage of buildings and homes, the destructive power of fire is immense. Surveys within the insurance industry estimate the monetary cost that is attributed to the destructive forces of fire is from 0.01 to 0.03% of GDP for each developed country, while the loss of human life exceeds 10,000 individuals per year [see "World Fire Statics" (Geneva Association Information, Newsletter No. 23, October 2007)]. Beyond these substantial costs are the environmental costs that are caused by fire, which include the toxic release of large quantities of pollutants (e.g. dioxins) and smoke into the atmosphere, which cause damage to the environment and impact human health.

In order to avoid these tragic consequences, development efforts have been placed on fire prevention measures, which far exceed the improvements made in the area of fire extinguishing measures. In particular, fire prevention measures include the use of flame and smoke detectors, automatic fire extinguishing and alarm systems. In addition, fire prevention measures also encompass treating objects to be protected from fire, such as by facing, coating, or covering, with non-flammable materials, which are defined herein as materials that either hinder or impede the start of fire (fire-resistant) and/or retards the growth or expansion of an existing fire (fire-retarder). These non-flammable materials operate by reducing the flammable nature of the target materials that are used to form a final item, object or product that is used by the public. Such target materials may include construction materials, such as electrical wiring, as well as various other items, such as clothing, carpets, and furniture, etc. Currently, such non-flammable materials are ubiquitous in everyday products, including children's garments, carnival costumes, and the like. In fact, many objects, items and products are required by government regulation to meet certain specifications for limiting their flammability. As a result, the risk of such items catching fire, causing burns, or even causing death to users is substantially reduced.

The role of non-flammable materials is to prevent the start of a fire, and/or to at least to slow its spread, in order to allow an individual to have a sufficient amount of time to react and extinguish the fire, or to escape from it.

Typically, a fire start is initiated during a preliminary period when a substrate material sustains local heating from a heat source, such as a cigarette ash or butt, resulting in localized cracking of the substrate. This heating and cracking of the substrate release a small quantity of combustible gases, which subsequently ignite as soon as these combustible gases reach a required concentration and the necessary ignition temperature. As a result of this gas ignition, the cracking of the substrate accelerates and thus, the fire spreads.

Additionally, while non-flammable materials may be formed of organic or inorganic compounds, they serve to perform their fire-resistant and/or fire-retardant functions by natural or chemical means. In the case of natural fire-resistant/retardant materials, they function by cooling the hot substrate down to a temperature that is below the temperature that is required to sustain combustion of the fire via an endothermal process. Specifically, such natural non-flammable materials are capable of forming a non-combustible gas layer (e.g. water vapor) that cools the hot substrate and limits the further release of cracking gases. In addition, chemical based non-flammable materials utilize certain chemical compositions to arrest free radicals or the creation of a heat insulating shell of a fire.

SUMMARY

Therefore, in some embodiments, a non-flammable material includes ceramic material, such as a powder, at a proportion of 15-45% and preferably 20-30%; graphite at a proportion of 0.5-40% and preferably 10-35%; mica at a proportion of 10-30% and preferably 15-25%; and $ZrO_2$ at a proportion of 10-30% and preferably 15-25%.

DETAILED DESCRIPTION

The embodiments disclosed herein relate to non-flammable compositions, which are defined herein as compositions having fire-resistant properties (i.e. resists burning or starting on fire) and/or fire-retardant properties (i.e. slows the spread of fire that has started).

Specifically, the non-flammable compositions may be mixed or otherwise incorporated into other target materials, items or objects. For example, such target materials include, but are not limited to polymers, elastomers, or dyes, and the non-flammable compositions act as a heat repellant preventing the temperature of the target raw material from increasing, when subjected to fire thereby making the item non-flammable. It should also be appreciated that the term "item" is defined herein as any object, fabric, or combination thereof. For example, such item may include railroad ties or telephone poles, which are formed of natural or synthetic materials.

The non-flammable composition comprises a mix or combination of materials, such as inorganic materials for example, at suitable concentrations. In some embodiments, the non-flammable composition may be formed by mixing, or otherwise combining, the following combination of materials:

1) Ceramic material, such as ceramic powder, at proportions ranging from 15-35%, preferably 20-30%;
2) Graphite at proportions ranging from 0.5-40%, preferably 10-35%;
3) Mica at proportions ranging from 10-30%, preferably 15-25%; and 4) Zirconia dioxide ($ZrO_2$) at proportions ranging from 10-30%, preferably 15-25%.

In other embodiments, the non-flammable composition includes:

1) Ceramic material, such as ceramic powder, at a proportion of 23-24%;
2) Graphite at a proportion of 34-35%;
3) Mica at a proportion of 20-21%; and
4) Zirconia dioxide ($ZrO_2$) at a proportion of 21-22%.

Furthermore, it should be appreciated that the proportion of ceramic material may be between 20-40%, and 25-35%, as well as anywhere up to 45%; the proportion of graphite may be between 5-35%, 10-30%, and 15-25%, as well as anywhere up to 40%; the proportion of mica may be up to 30%; and the proportions of zirconia dioxide may be up to 30%.

It should be appreciated that the term "Ceramic powder or material", as used herein, refers to materials that contain $SiO_2$. In addition, the ceramic powder or material may be greater than or equal to the amount of other inorganic oxides in the non-flammable material, such as CaO, $Al_2O_3$, $CeO_2$, $Na_2O$, $K_2O$, $B_2O_3$, ZnO, F, $Li_2O$, $ZrO_2$, SrO, $TiO_2$, as well as pigments. In some embodiments, ceramic powders or materials containing $SiO_2$ that exceed around 60% of the inorganic oxides of $Al_2O_3$, ZnO, $Na_2O$, $K_2O$ may include Calcined Alumina Powder, Alumina Oxide Powder, Silicon Nitride Powder, Ceramic Frit Glass, and the like.

With respect to graphite, any suitable form may be used. The percentage of graphite can be reduced for the purpose of reaching improved product aesthetics and allowing a lighter item or product color, if desired. However, in some embodiments, titanium dioxide may be added to the non-flammable composition to achieve a desired color of the target product or item being formed or treated.

Mica encompasses a group of silicon minerals whose chemical composition can be expressed as: $X_2Y_{4-6}Z_8O_{20}(OH,F)_4$, where X is K, Na or Ca;
Y is Al, Mg or Fe, Mn, Cr, Ti, or Li; and
Z is Si or Al, however it should be appreciated that in some embodiments $Fe^{3+}$ or Ti may also be included into the non-flammable composition.

In some embodiments, Mica may encompass "common mica", which is expressed by the chemical formulas: $K_2Al_2(AlSi_3O_{10}(F_3OH)_2$, $KAl_2(AlSi_3O_{10}(F_3OH))_2$, or $(KF)_2(AL_2O_3)_3(SiO_2)_6(H_2O)$, which is also known as muscovite.

Finally, $ZrO_2$ (Zirconium Dioxide) in any suitable form may be utilized. It should be appreciated that Zirconium Dioxide may be replaced with any inorganic oxide material. In other embodiments, the non-flammable composition may be configured so that the Zirconium Dioxide is replaced with Magnesium Hydroxide.

In some embodiments, the non-flammable composition may be produced by combining the ingredients discussed above using any suitable technique, such as by mixing. In the case of mixing the ingredients of the non-flammable composition, any mechanical mixing technique may be used, such as those provided by mixers of any suitable capacity. In addition, the ingredients utilized in the non-flammable composition may be combined in any desired order or sequence.

The non-flammable composition includes a variety of properties, including one or more of non-inflammable, biodegradable, non-toxic and water-proof.

As previously discussed, the non-flammable composition may be utilized as either an additive to be incorporated into the raw target materials that used to form or manufacture an item or may be used as a coating or other surface treatment that is applied to the surface of the item after the item has been formed or manufactured.

Accordingly, the non-flammable composition may be mixed, or otherwise combined, with any other target material, such as polymeric materials, such as in the case of manufacturing plastic items. It should be appreciated that the target material may comprise nanometer sized particles. In some embodiments, the non-flammable material may be particleized, or formed into particles, such as nanometer-sized particles, before being added to a target material used to form an item, or before being applied to the surface of the item. For example, the non-flammable composition may be first ground or made into particles in order to achieve a uniform separation of the total mass and, to achieve the formation of items that have durability, and sustainability, as well as fire-resistant/retardant properties.

The non-flammable composition can also be used to form a rigid cladding layer, sheeting or covering that is applied or otherwise placed upon the item. Such cladding layer may be formed by means of producing a suspension of the non-flammable composition into water at a proportion of about 20%, whereupon the suspension is coated or applied on the item using a paint brush, spray, roller, or any other suitable means. For example, during an experimental trial with a flame cutter, a wooden box coated with the non-flammable composition resisted catching on fire when exposed to a temperature near 2200° C.

In another aspect, the surface of item may be treated by soaking the surface of the item to be protected in the non-flammable composition. Soaking may be performed utilizing any suitable technique, such as solvent deposition, mechanical deposit, sol-gel, and the like. Such soaking augments the prevention of thermal degradation and the development of combustion products when a treated item is exposed to fire. Alternatively, the non-flammable composition may be applied to items, by air or water jetting, so that the non-flammable composition acts as a fire extinguishing material.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. A non-flammable material comprising:
ceramic powder at a proportion of 23-24%;
graphite at a proportion of 34-35%;
mica at a proportion of 20-21%; and
$ZrO_2$ at a proportion of 21-22%.

2. The material of claim 1, wherein said material comprises particles having a nanometer-sized dimension.

3. The material of claim 1, further comprising:
polymeric material.

4. The material of claim 3, wherein said polymer material comprises particles having a nanometer-sized dimension.

5. The material of claim 1, wherein said material is in a water suspension.

6. The material of claim 5, wherein said water suspension is at a proportion of about 20%.

7. A method of making an item with the material of claim 1, comprising:
treating the item with said material.

8. The method of claim 7, wherein said treating step is performed by solvent deposition, mechanical deposit, or sol-gel.

9. The method of claim 7, wherein said treating step includes coating.

10. The method of claim 7, wherein said treating step includes soaking.

11. The method of claim 7, wherein said treating step includes integrating said material into a target material forming at least a part of said item.

12. An item including the material of claim 1, wherein said item comprises a railroad tie or a telephone pole.

13. An item including the material of claim 1.

* * * * *